United States Patent
Budweiser et al.

(10) Patent No.: US 12,452,183 B2
(45) Date of Patent: Oct. 21, 2025

(54) IDENTIFYING ERRORS IN A COMPUTER NETWORK BY COMPARING AN ACTUAL CONFIGURATION WITH A TARGET CONFIGURATION

(71) Applicant: Bayerische Motoren Werke Aktiengesellschaft, Munich (DE)

(72) Inventors: Karl Budweiser, Munich (DE); Christoph Gollob, Karlsfeld (DE); Daniel Matlok, Stein (DE); Andreas Schramm, Neufahrn (DE); Andreas Tscherner, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 314 days.

(21) Appl. No.: 17/919,007

(22) PCT Filed: Apr. 8, 2021

(86) PCT No.: PCT/EP2021/059157
§ 371 (c)(1),
(2) Date: Oct. 14, 2022

(87) PCT Pub. No.: WO2021/219337
PCT Pub. Date: Nov. 4, 2021

(65) Prior Publication Data
US 2023/0336491 A1   Oct. 19, 2023

(30) Foreign Application Priority Data

Apr. 27, 2020 (DE) ............. 10 2020 111 450.8

(51) Int. Cl.
*H04L 47/28* (2022.01)
*B60W 60/00* (2020.01)
*H04L 1/1867* (2023.01)

(52) U.S. Cl.
CPC ............ *H04L 47/28* (2013.01); *B60W 60/00* (2020.02); *H04L 1/1867* (2013.01)

(58) Field of Classification Search
CPC ................. H04L 47/28; H04L 1/1867; H04L 2001/0097; H04L 1/0035; B60W 50/0098;
(Continued)

(56) References Cited

U.S. PATENT DOCUMENTS 8,909,622 B1 * 12/2014 Emigh .................. H04L 41/069
707/722
10,333,988 B2   6/2019 Porras et al.
(Continued)

FOREIGN PATENT DOCUMENTS

CN   101582838 A   11/2009
CN   101969661 A   2/2011
(Continued)

OTHER PUBLICATIONS

International Search Report (PCT/ISA/210) issued in PCT Application No. PCT/EP2021/059157 dated Jun. 30, 2021 with English translation (four (4) pages).
(Continued)

*Primary Examiner* — Mounir Moutaouakil
(74) *Attorney, Agent, or Firm* — Crowell & Moring LLP

(57) ABSTRACT

According to one aspect, the invention relates to a device for identifying errors in a computer network. The network comprises at least one coupling element, which interconnects at least two network subscribers. The coupling element comprises a memory for an actual configuration of the coupling element. The coupling element forwards or discards data packets according to the actual configuration. The device has a target configuration for the coupling element,
(Continued)

and the device is designed to compare the actual configuration with the target configuration.

11 Claims, 1 Drawing Sheet

(58) Field of Classification Search
CPC ......... B60W 60/00; B60W 2050/0006; B60W 50/0205; B60W 50/04; B60W 2050/021; B60Y 2306/15
See application file for complete search history.

(56) References Cited

U.S. PATENT DOCUMENTS

| | | |
|---|---|---|
| 2011/0119556 A1 | 5/2011 | De Buen |
| 2012/0036250 A1 | 2/2012 | Vaswani et al. |
| 2012/0155268 A1 | 6/2012 | Ohshio |
| 2014/0114497 A1 | 4/2014 | Miyake |
| 2014/0204778 A1 | 7/2014 | Saito et al. |
| 2016/0212096 A1* | 7/2016 | Gao ..................... H04L 63/02 |
| 2017/0078210 A1* | 3/2017 | Wang ..................... H04L 47/32 |
| 2017/0244594 A1 | 8/2017 | Shiota et al. |
| 2017/0272366 A1 | 9/2017 | Bush et al. |
| 2017/0364053 A1* | 12/2017 | Hadeli ................ H04L 63/1416 |
| 2019/0332823 A1 | 10/2019 | Kwon et al. |
| 2020/0092726 A1 | 3/2020 | Yang |
| 2021/0168120 A1* | 6/2021 | Zinner ................ H04L 63/0227 |
| 2024/0367679 A1* | 11/2024 | Meyers ............... B60W 60/001 |

FOREIGN PATENT DOCUMENTS

| | | |
|---|---|---|
| CN | 105471835 A | 4/2016 |
| CN | 107707415 A | 2/2018 |
| CN | 108810899 A | 11/2018 |
| CN | 108965010 A | 12/2018 |
| CN | 109327324 A | 2/2019 |
| DE | 103 09 098 A1 | 9/2004 |
| DE | 103 36 793 B4 | 6/2005 |
| DE | 10 2010 043 991 A1 | 6/2011 |
| DE | 11 2012 002 836 T5 | 4/2014 |
| EP | 1 420 317 A2 | 5/2004 |
| EP | 3 258 661 A1 | 12/2017 |
| JP | 2003-85139 A | 3/2003 |
| JP | 2012-134582 A | 7/2012 |
| JP | 2014-143499 A | 8/2014 |
| JP | 2017-152762 A | 8/2017 |
| WO | WO 2020/035584 A1 | 2/2020 |

OTHER PUBLICATIONS

German-language Written Opinion (PCT/ISA/237) issued in PCT Application No. PCT/EP2021/059157 dated Jun. 30, 2021 (eight (8) pages).
German-language Search Report issued in German Application No. 10 2020 111 450.8 dated Mar. 31, 2021 with partial English translation (11 pages).
"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).
Japanese-language Office Action issued in Japanese Application No. 2022-559605 dated Dec. 25, 2024 with English translation (7 pages).
Japanese-language Office Action issued in Japanese Application No. 2022-559605 dated Mar. 26, 2025 with English translation (2 pages).
Chinese-language Office Action issued in Chinese Application No. 202180030615.7 dated Dec. 28, 2024 with partial English translation (14 pages).
Korean-language Office Action issued in Korean Application No. 10-2022-7034752 dated Jan. 22, 2025 with English translation (11 pages).

* cited by examiner

IDENTIFYING ERRORS IN A COMPUTER NETWORK BY COMPARING AN ACTUAL CONFIGURATION WITH A TARGET CONFIGURATION

BACKGROUND AND SUMMARY OF THE INVENTION

The invention concerns a device and a method for identifying errors and anomalies in a computer network.

In the context of the document, the term "automated driving" may be understood as driving with automated longitudinal or lateral guidance or autonomous driving with automated longitudinal and lateral guidance. The term "automated driving" includes automated driving with any degree of automation. Exemplary degrees of automation are assisted, semi-automated, highly automated or fully automated driving. These levels of automation were defined by the Federal Railway Research Institute (BASt) (see BASt publication "Research compact", issue November 2012). In assisted driving, the driver permanently carries out the longitudinal or lateral guidance, while the system performs the other function within certain limits. In semi-automated driving (TAF), the system takes over the longitudinal and lateral guidance for a certain period of time and/or in specific situations, wherein the driver must permanently monitor the system as in assisted driving. During highly automated driving (HAF), the system takes over the longitudinal and lateral guidance for a certain period of time without the driver having to monitor the system permanently; however, the driver must be able to take over the vehicle driving within a certain period of time. In fully automated driving (VAF), for a specific use case the system can automatically manage driving in all situations; no driver is required for this use case. The above four degrees of automation according to the definition of the BASt correspond to the SAE levels 1 to 4 of the standard SAE J3016 (SAE-Society of Automotive Engineering). For example, highly automated driving (HAF) corresponds to the BASt level 3 of the SAE J3016 standard. Furthermore, SAE J3016 provides for SAE level 5 as the highest degree of automation, which is not included in the definition of the BASt. SAE Level 5 corresponds to driverless driving, in which the system is able to automatically handle all situations like a human driver during the entire journey; a driver is generally no longer required.

It is an object of the invention to identify an error or anomaly in a computer network, in particular in a computer network of an automated motor vehicle.

The object is achieved by the claimed invention. It should be noted that additional features of a claim which is dependent on an independent claim without the features of the independent claim or only in combination with a subset of the features of the independent claim could form a separate invention which is independent of the combination of all the features of the independent claim and which is the subject-matter of an independent claim, a division application or a subsequent application. This applies in the same way to technical lessons described in the description, which may constitute an invention independent of the features of the independent claims.

A first aspect of the invention concerns a device for identifying errors or anomalies in a computer network.

The computer network, in particular an Ethernet network, comprises at least one coupling element (connecting element), in particular a switch or hub. Switch (from English for "schalter", "Umschalter" or "Weiche", also called Netzwerkweiche or Verteiler) refers to a coupling element in computer networks that connects network segments to each other. Within a segment (broadcast domain), it ensures that data packets reach their destination.

The term switch generally refers to a multiport bridge, i.e. an active network device that forwards frames based on information from the data link layer (layer 2) of the OSI model. Sometimes the more precise terms bridging hub or switching hub are also used. In the IEEE 802.3 standard, the function is called a MAC Bridge.

The device on the network layer 1 (layer 1) comparable to the switch is called a (repeater) hub. Switches that additionally process data on the network layer (layer 3 and higher) are often referred to as layer 3 switches or multilayer switches and can perform the function of a router. In non-Ethernet networks, the coupling task is assigned to a so-called gateway, which can connect heterogeneous networks to each other in a similar way to a router or switch.

The coupling element connects at least two network subscribers to each other, wherein a network subscriber can also be a further coupling element.

The coupling element comprises a memory for an actual configuration of the coupling element and decides whether it forwards or discards data packets depending on this actual configuration.

The device comprises a target configuration for the coupling element and is set up to compare the actual configuration with the target configuration.

The comparison between the target configuration and the actual configuration can be made once or several times, wherein in particular the comparison is repeated regularly.

In this context, embodiments of the invention are based on the finding that due to errors such as external interference, the actual configuration in the memory of the coupling element may be falsified, which may lead to undesirable behavior when forwarding or discarding data packets.

In addition, the finding is based on the fact that even with a configuration that is correct or not falsified, the coupling element can have a different behavior than that specified by the configuration due to external influences, systematic errors or random errors.

By comparing the actual configuration with the target configuration, it can be determined at least in a snapshot whether the actual configuration is changed relative to the target configuration due to an error. Although the target configuration can also be changed due to an error, the probability that both the actual configuration and the target configuration have the same error at the time of the comparison is very low and can be technically reduced to any extent by coding measures. In an advantageous embodiment, the device is a network subscriber connected to the coupling element.

In addition to the actual configuration, the device can also have access to diagnostic counters of the coupling element, for example to be able to determine when, which and how many data packets were discarded and why. That mechanism may be used in the case of an advantageous embodiment to ensure the integrity of certain configuration items. The device is set up to send a predetermined number of data packets, which are suitable for testing configuration items of the coupling element for network separation of the primary and secondary control units, via the coupling element to another network subscriber at a predetermined time, to determine the number of data packets discarded by the coupling unit, and to compare the number of data packets sent to the other network subscriber with the number of data packets discarded by the coupling unit.

Suitable data packets are those with which the correctness of individual components of the configuration can be tested, for example, packets with an unconfigured VLAN should be discarded. The knowledge of the target system behavior, i.e. a signature of an integer network, can also be advantageously exploited.

Here, embodiments of the invention are based on the knowledge that the amount of data discarded by a coupling element running error-free is defined with the configured limits (for example a defined amount of data per time) or other configurable properties or filter rules as well as by the performance capability of the coupling element itself.

In a further advantageous embodiment, the configuration of the coupling element specifies at least an upper limit for the data packets forwarded by the coupling element within a predetermined time, in particular by specifying a data rate, for example in Mbit/s units.

For example, this may be traffic shaping. Traffic shaping refers to a type of queue management in packet-switched data networks in which data packets are delayed or discarded according to certain criteria in order to satisfy certain requirement profiles. This function is carried out by the interaction of a network scheduler and a network shaper and is basically a form of data rate limiting. Traffic shaping is unidirectional and usually without memory, which means that, in contrast to data flow control, it works without control information from the other side.

Alternatively, it may be traffic policing, for example. Traffic policing is a traffic flow method similar to traffic shaping, with the difference that it refers to incoming data packets and installs rules that allow it to destroy non-conformant data packets. In contrast to traffic shaping, no packets are temporarily stored, but an account is kept of how often the policing function has destroyed packets.

In a further advantageous embodiment of the invention, the configuration of the coupling element specifies characteristic upper limits for the forwarding of the data packets received by a network subscriber within a predetermined time (for example, by traffic policing), and/or upper limits for the forwarding of the data packets sent to the network subscriber within a predetermined time (for example through traffic shaping). In particular, the upper limits can be chosen in such a way that an integer network and its characteristic traffic signature are not affected thereby, but anomalous traffic or misconfiguration are identified and packets that belong to an atypical traffic pattern are discarded. These packet losses can be used as an indicator of network integrity.

As a supplement to this embodiment, the useful traffic may also be designed in such a way that the selected upper limits can become narrower and more sensitive. This can be implemented, for example, by "smoothing" a short-term high data rate to a longer time interval in order to avoid traffic peaks.

In a further advantageous embodiment, the device is set up to compare the difference of the number of data packets sent to the other network subscriber and the number of data packets discarded by the coupling unit with at least one upper limit for the data packets forwarded by the coupling element within a predetermined time.

Here, embodiments of the invention are based on the finding that due to the comparison inferences can be drawn about an incorrect configuration of the coupling unit. In addition, the coupling element consists of a plurality of technical elements which together form a chain of action. The configuration is only one part of this chain of action. Due to the comparison, inferences can be drawn about an error in the complete chain of action within the coupling element which can be identified by the measure and causes a deviation from the target function.

In a further advantageous embodiment, some comparisons are made with the highest available ASIL integrity.

In a further advantageous embodiment, the comparisons are initiated by an element external to the chain of action and developed with the required integrity (for example according to ISO 26262 or IEC 61508) and the results are also read back by this. The comparison takes place within the integral element outside the chain of action. In order to intercept a dangerous false negative case, the selected pattern of the query, of the read back and, if appropriate, the necessarily sent test data must be selected to be so complex that the probability that an E/E error within the chain of action can generate this randomly or systematically is sufficiently unlikely.

In a further advantageous embodiment, individual elements within the chain of action, which are checked by way of an integral element outside the chain of action, can also be developed according to the required integrity. The error traps avoided by this no longer have to be intercepted by the higher level measures which are carried out by the element outside the chain of action. This can, for example, lead to a reduction of the requirements on the pattern of the query used, the read back and possibly the necessary test data.

Another advantageous embodiment of the invention is a driving system for automated driving for a motor vehicle, wherein the driving system comprises a primary control unit for automated driving and a secondary control unit for automated driving.

The division of the automated driving function into a primary control unit and a secondary control unit can be carried out, for example, due to functional safety requirements that require a redundant system design.

The primary control unit and the secondary control unit each comprise a device according to any one of the previous claims and a coupling element, wherein the coupling elements are connected to each other.

Thus in particular a network topology results in which the device of the primary control unit is connected to the coupling element of the primary control unit, which in turn is connected to the coupling element of the secondary control unit, which in turn is connected to the device of the secondary control unit.

In a further advantageous embodiment, the configuration of the coupling elements specifies an upper limit for the forwarding of the data packets received by a network subscriber within a predetermined time and an upper limit for the forwarding of the data packets sent to the network subscriber within a predetermined time, wherein the upper limit for the forwarding of data packets sent to the other coupling element within a predetermined time is lower or higher than the upper limit for forwarding the data packets received by a coupling element within a predetermined time.

Here, embodiments of the invention are based on the finding that by the selected relationship of the two upper limits with each other, an error within a chain of action within the two coupling elements, in particular an incorrect configuration of the two coupling units, can be determined.

In a further advantageous embodiment of the invention, the primary control unit and the secondary control unit each comprise the device discussed above wherein the predetermined time is before the activation of an automated driving mode for the motor vehicle and/or during an active automated driving mode for the motor vehicle.

Here, embodiments of the invention are based on the knowledge that the identification of an error by way of the invention is only a snapshot and an error may occur shortly after the error identification.

Since the occurrence of errors can be considered a statistical process, the cumulative probability of errors increases over time. It is therefore advantageous to select the predetermined time shortly before the activation of the automated driving mode in order to reduce the probability of the occurrence of errors before this safety-related demanding event.

In order to ensure a sufficiently high level of error identification in the measure and thus its availability in the event of an emergency, it must be ensured that a failure is sufficiently unlikely to occur together with a babbling idiot fault. Background: An undetected failure of the measure (shaping/policing) (latent error) in the presence of a babbling idiot fault would immediately cause a two-sided failure of the subnetwork. To this end, two priorities must be covered.

If there is a systematic error, it is inevitably triggered by a changing environment variable. It must therefore be ensured that the checking of the measure (shaping/policing) takes place in boundary conditions that are as identical as possible, in which a babbling idiot fault could trigger a safety-relevant event. A suitable time for a highly automated vehicle, for example, would be shortly before the handover of the driving task from the driver to the vehicle and if possible during automated driving. An unsuitable time would be when the vehicle is for example in sleep mode, i.e. the boundary conditions do not correspond to the boundary conditions during highly automated travel.

In order to adequately counter a random error, the repetition frequency of the monitoring of the measure (shaping/policing) must be selected in such a way that the error rate to be assumed which leads to ineffectiveness of the same multiplied by the probability of occurrence of a babbling idiot fault within the monitoring interval is sufficiently small to meet the integrity requirements. If it is not sufficient, the monitoring interval must be reduced.

In a further advantageous embodiment, the device of a control unit is set up to send at at least one predetermined time a data packet with low priority to the other device via the coupling element of this control unit and the coupling element of the other control unit, wherein the priority of the data packet is chosen in such a way that in the event of any unexpected communication which, for example, displaces the useful communication, the data packet between the two coupling units is discarded by one of the coupling elements, and the other device is set up to expect the reception of this data packet essentially at the predetermined time.

A second aspect of the invention concerns a method for identifying errors in a computer network, wherein the network comprises at least one coupling element that connects at least two network subscribers to each other, the coupling element comprises a memory for an actual configuration of the coupling element, and the coupling element forwards or discards data packets depending on the actual configuration.

One step of the procedure is to compare the actual configuration with a target configuration for the coupling element.

The above statements regarding the device according to the invention according to the first aspect of the invention also apply in a corresponding manner to the method according to the invention according to the second aspect of the invention. At this point and in the claims, not explicitly described advantageous exemplary embodiments of the method according to the invention correspond to the advantageous exemplary embodiments of the device according to the invention described above or described in the claims.

The invention is described below on the basis of an exemplary embodiment with the help of the enclosed drawings.

DETAILED DESCRIPTION OF THE DRAWINGS

Figure 1:
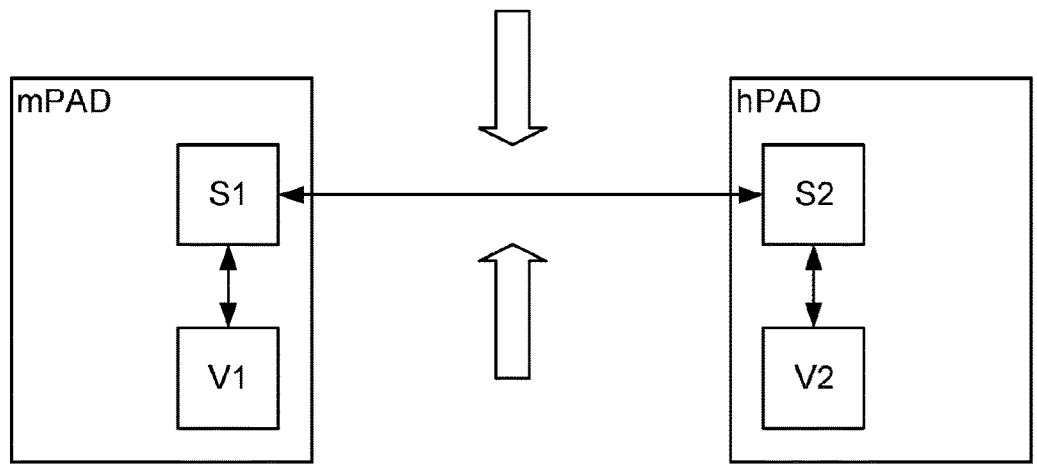
FIG. 1 shows an exemplary embodiment of the driving system according to the invention.

FIG. 1 shows a driving system for automated driving for a motor vehicle, wherein the driving system has a primary control unit hPAD for automated driving and a secondary control unit mPAD for automated driving.

The primary control unit hPAD and the secondary control unit mPAD each comprise a device V1, V2 and a coupling element S1, S2 according embodiments of to the invention, wherein the coupling elements S1, S2 are connected to each other.

The coupling elements S1, S2 and the devices V1, V2 form a computer network, wherein the coupling elements S1, S2 and the devices V1, V2 are network subscribers.

The coupling elements S1, S2 each comprise a memory for an actual configuration of the coupling element S1, S2, and the coupling elements S1, S2 are each set up to forward or discard data packets depending on the actual configuration.

The devices V1, V2 each comprise a target configuration for the respective coupling element S1, S2 of their control unit hPAD, mPAD and the devices V1, V2 are each set up to compare the actual configuration with the target configuration.

The devices V1, V2 are each set up to send at a predetermined time a predetermined number of data packets via the coupling elements S1, S2 to another network subscriber, for example to the respective other device V1, V2.

In that regard, the predetermined time is before the activation of an automated driving mode for the motor vehicle and/or during an active automated driving mode for the motor vehicle.

The configuration of the coupling elements specifies at least one upper limit O1, O2 for the forwarding of data packets received by a network subscriber within a predetermined time and an upper limit for the forwarding of the data packets sent to the network subscriber within a predetermined time, wherein the upper limit O1 for the forwarding of the data packets sent to the other coupling element S1, S2 within a predetermined time is lower than the upper limit O2 for the forwarding of data packets received by a coupling element S1, S2 within a predetermined time.

In addition, the devices V1, V2 are set up in each case to determine the number 11, 12 of data packets rejected by the coupling unit S1, S2 and to compare the difference between the number ds of data packets sent to the other network subscriber and the number 11, 12 of data packets discarded by the coupling unit S1, S2 with at least an upper limit O1, O2 for the data packets forwarded by the coupling element S1, S2 within a predetermined time.

In addition, the devices V1, V2 of a control unit hPAD, mPAD are each set up to send a data packet with low priority to the respective other device V1, V2 via the coupling element S1, S2 of this control unit hPAD, mPAD and the coupling element S1, S2 of the other control unit hPAD, mPAD at at least one predetermined time, wherein the priority of the data packet is chosen in such a way that for each unexpected communication that displaces a useful communication between the two coupling units S1,S2 the data packet is rejected by one of the coupling elements S1, S2, and the other device V1, V2 is set up to expect receipt of that data packet essentially at the predetermined time.

Figure 2:
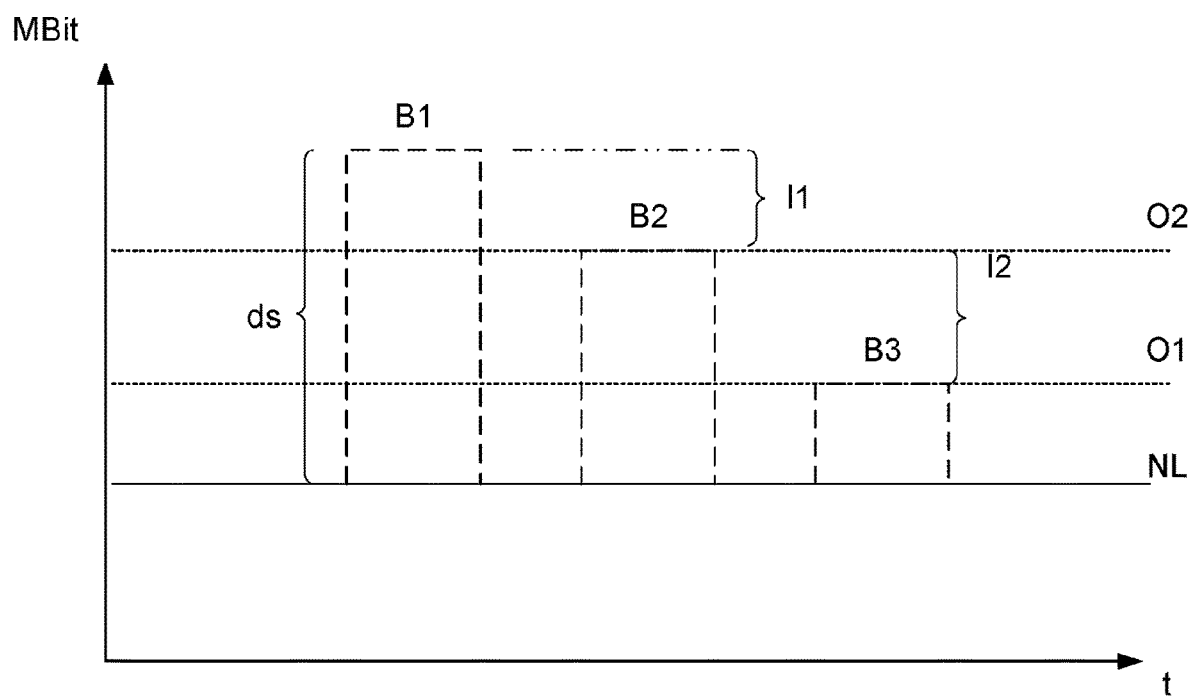
FIG. 2 shows an exemplary profile of data transfer rates.

FIG. 2 shows an exemplary profile of data transfer rates. For this data transfer rates are plotted in MBit against time t.

A data transfer level NL is shown, which is usually transmitted as a payload. This payload NL is lower than two upper limits O1, O2. The upper limit O1 for the forwarding of the data packets sent to the other coupling element S1, S2 within a predetermined time is lower than the upper limit O2 for forwarding the data packets received by a coupling element S1, S2 within a predetermined time.

In addition, three so-called bursts B1, B2, B3 are shown. These result at predetermined times by sending a predetermined number ds of data packets by a device V1, V2 via a coupling element S1, S2 to another network subscriber.

The burst B1 shows the number ds of the data packets actually sent by the device V1, V2. This number ds exceeds the two upper limits O1, O2. If the coupling elements S1, S2 worked without errors, a number I1 of data packets would be discarded by the first coupling unit S1, S2. Thus only one burst B2 would be received at the other coupling unit S1, S2. This other coupling unit S1, S2 would discard a number I2 of data packets, so that only one burst B3 would arrive at the other device V1, V2.

Since both the number ds of data packets is known as well as the two upper limits O1, O2, it can be determined by the receiving device V1, V2 whether there is an error in the computer network, for example an error in the actual configuration of the coupling elements S1, S2, by comparing the actually received data packets with a number of expected data packets resulting from the difference of the number ds of data packets sent to the device and the upper limits O1, O2.

If, for example, the number of actually received data packets exceeds the upper limit O2 for forwarding the data packets received by a network subscriber within a predetermined time, then it can be concluded that there is an error in the actual configuration of the receiving coupling element S1, S2.

If for example the number of data packets actually received exceeds the upper limit O1 for forwarding the data packets sent to the network subscriber within a predetermined time, it can be concluded that there is an error in the actual configuration of the sending coupling element S1, S2.

The invention claimed is:

1. A device for detecting errors in a computer network, wherein the computer network comprises a coupling element which connects at least two network subscribers of the computer network to each other, the coupling element comprises a memory for an actual configuration of the coupling element, and the coupling element forwards or discards data packets depending on the actual configuration, the device comprising:
a target configuration for the coupling element, wherein the device is configured:
to compare the actual configuration with the target configuration,
to send a predetermined number of data packets via the coupling element to a network subscriber at a predetermined time,
to determine a number of data packets discarded by the coupling element, and
to compare the number of data packets sent to the network subscriber with the number of data packets discarded by the coupling element.

2. The device according to claim 1, wherein:
the device is another network subscriber connected to the coupling element.

3. The device according to claim 1, wherein a configuration of the coupling element specifies at least one upper limit for the data packets forwarded by the coupling element within a predetermined time.

4. The device according to claim 3, wherein the configuration of the coupling element at least one of:
specifies at least one upper limit for forwarding of data packets received by a network subscriber within the predetermined time, or
specifies at least one upper limit for forwarding of the data packets sent to the network subscriber within the predetermined time.

5. The device according to claim 3, wherein the device is further configured to compare a difference of a number of data packets sent to other network subscribers and a number of data packets discarded by the coupling element with the at least one upper limit for the data packets forwarded by the coupling element within the predetermined time.

6. A driving system for automated driving for a motor vehicle, the driving system comprising:
a primary control unit for automated driving, and
a secondary control unit for automated driving,
wherein each of the primary control unit and the secondary control unit comprises the device according to claim 1,
wherein the primary control unit further comprises a first coupling element,
wherein the secondary control unit further comprises a second coupling element, and
wherein the coupling elements are connected to each other.

7. The driving system according to claim 6, wherein:
a configuration of the coupling elements specifies a respective upper limit for the forwarding of data packets received by a network subscriber within a predetermined time and an upper limit for the forwarding of data packets sent to the network subscriber within the predetermined time, and
the upper limit for the forwarding of data packets sent to the second coupling element within the predetermined time is lower than the upper limit for the forwarding of the data packets received by the first coupling element within the predetermined time.

8. The driving system according to claim 7, wherein the predetermined time at least one of:
is before an activation of an automated driving mode for the motor vehicle, or
is during an active automated driving mode for the motor vehicle.

9. The driving system according to claim 6, wherein:
the device in the primary control unit is configured to send at least one data packet at a predetermined time with low priority to the device in the secondary control unit via the first coupling element of the primary control unit and the second coupling element of the secondary control unit, and
the priority of the data packet is selected such that in an event of any unexpected communication between the coupling elements, the data packet from the first coupling element is discarded, and the device of the secondary control unit is configured to expect reception of the discarded data packet essentially at the predetermined time.

10. A method for identifying errors in a computer network, wherein the computer network comprises a coupling element which connects at least two network subscribers of the computer network to each other, the coupling element comprises a memory for an actual configuration of the coupling element, and the coupling element forwards or discards data packets depending on the actual configuration, the method comprising:
    comparing the actual configuration with a target configuration for the coupling element,
    sending a predetermined number of data packets via the coupling element to a network subscriber at a predetermined time,
    determining a number of data packets discarded by the coupling element, and
    comparing the number of data packets sent to the network subscriber with the number of data packets discarded by the coupling element.

11. A driving system for automated driving for a motor vehicle, the driving system comprising:
    a primary control unit for automated driving, and
    a secondary control unit for automated driving, wherein:
    the primary control unit comprises a first coupling element comprising a first memory for an actual configuration of the first coupling element and a first device comprising a target configuration for the first coupling element, wherein the first device is configured to compare the actual configuration of the first coupling element with the target configuration of the first coupling element, and the first coupling element forwards or discards data packets depending on the actual configuration for the first coupling element,
    the secondary control unit comprises a second coupling element comprising a second memory for an actual configuration of the second coupling element and a second device comprising a target configuration for the second coupling element, wherein the second device is configured to compare the actual configuration of the second coupling element with the target configuration of the second coupling element, and the second coupling element forwards or discards data packets depending on the actual configuration for the second coupling element,
    the coupling elements are connected to each other,
    the first device in the primary control unit is configured to send at least one data packet at a predetermined time with low priority to the second device in the secondary control unit via the first coupling element of the primary control unit and the second coupling element of the secondary control unit, and
    the priority of the data packet is selected such that in an event of any unexpected communication between the coupling elements, the data packet from the first coupling element is discarded, and the device of the secondary control unit is configured to expect reception of the discarded data packet essentially at the predetermined time.

* * * * *